July 6, 1954 J. H. PORTER 2,682,918
AIR CUSHION
Filed May 10, 1952
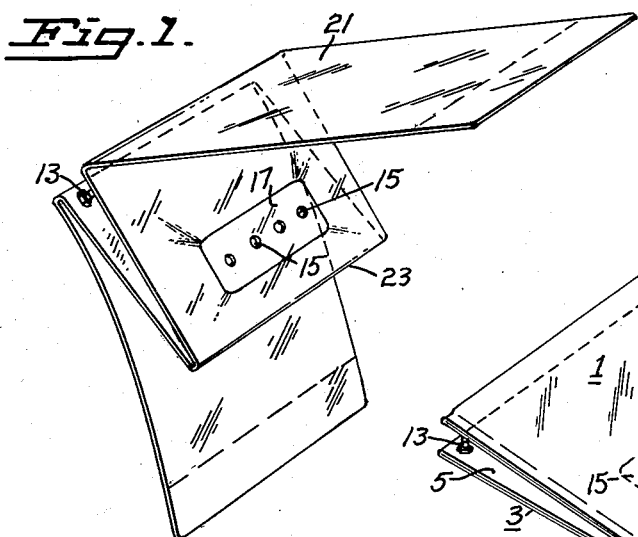
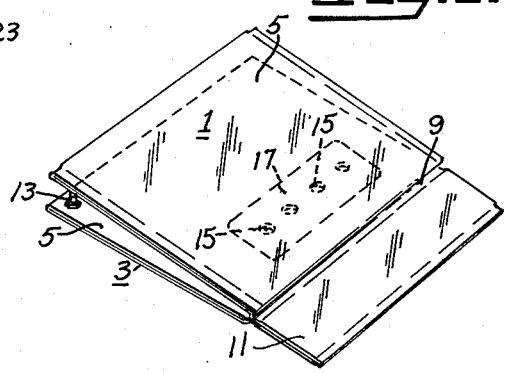
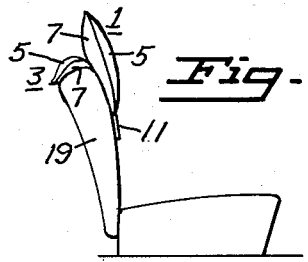
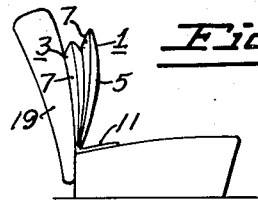
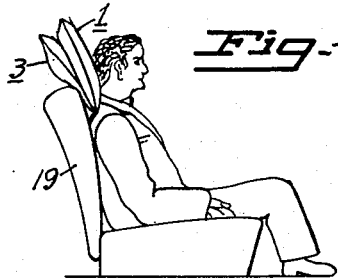
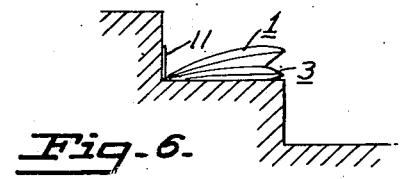
INVENTOR.
JAMES H. PORTER
BY
Bruce & Brosler
HIS ATTORNEYS Patented July 6, 1954

2,682,918

UNITED STATES PATENT OFFICE 2,682,918

AIR CUSHION

James H. Porter, Berkeley, Calif.

Application May 10, 1952, Serial No. 287,116

3 Claims. (Cl. 155—182)

My invention relates to cushions, and more particularly to general purpose air cushions adaptable for use as a seat cushion, head or back rest.

Among the objects of my invention are:

(1) To provide a novel and improved air cushion;

(2) To provide a novel and improved air cushion for use as a head rest and which is capable of maintaining a fixed position at the upper edge of a seat back, and particularly the seat backs in passenger automotive vehicles;

(3) To provide a novel and improved air cushion which may be used as a conventional pillow for the resting of the head, or which may be employed as a triangular cushion for use as a back support or as a seat cushion;

(4) To provide a novel and improved air cushion whose cushioning effect may be altered to suit one's individual tastes.

Additional objects of my invention will be brought out in the following description of a preferred embodiment of the same, taken in conjunction with the accompanying drawings wherein—

Figure 1 is a three-dimensional view depicting the air cushion of the present invention at an intermediate stage of its manufacture;

Figure 2 is a three-dimensional view of the same air cushion at completion;

Figure 3 is a view in section depicting said air cushion as positioned on the upper edge of a seat back for use as a head rest;

Figure 4 is a view in section illustrating the cushion of Figure 3 in use;

Figure 5 is a view in section illustrating the same serving as a triangular cushion back support;

Figure 6 is a view in section showing the air cushion of the preceding figures, employed as a seat cushion.

Referring to the drawings for details of my invention in its preferred form, the air cushion comprises a pair of hollow inflatable cushion sections 1 and 3, each having a front wall 5 and a rear wall 7, with the walls of both sections joined along a common airtight edge 9. Along said common edge and extending therefrom, is a flap 11.

An air valve 13 located preferably in a corner of one of the inflatable sections, provides for the introduction of air into such section. Any type of air valve may be employed, though I prefer one having an air passage therethrough and a mouthpiece threaded into such passage capable of being adjusted to close such passage following the introduction of air into the cushion section.

The air, thus introduced, is permitted access to the other inflatable section by way of an air communication passage between the two sections of the cushion.

This is accomplished by providing one or more holes 15 in the adjacent walls of the two sections, preferably in a symmetrically located area 17 in proximity to the common edge 9, and sealing the walls to each other around said holes to preclude escape of air from either of said cushion sections.

An air cushion possessing these structural features as described, provides a comfortable head rest when placed upon the upper edge of a seat back 19, and when so placed, becomes self-sustaining and will remain in a fixed position. The foregoing advantages are best understood when one analyzes just what happens when the air cushion is disposed on the upper edge of a seat back and utilized as a head rest.

When first placed in such position, the lower cushion section, in conforming to the curvature of the seat back, drives some of the air therefrom to the upper cushion section. The lower cushion section thus overhangs the upper edge of the seat back and functions in the nature of a hook to support the upper cushion section, with the result that the air cushion remains in a fixed position.

Immediately upon being put to use as a head rest, the pressure of the individual's head against the upper cushion section forces a transfer of air back from the upper cushion section into the lower cushion section, causing it to fill out and bolster the upper section of the cushion, thereby offering sound support for the individual's head. Promptly upon removal of one's head, the lower cushion section again becomes somewhat limp and overhangs the upper edge of the seat back, thus assuring that the cushion will remain in its assigned position.

As a triangular cushion in support of one's back or as a seat cushion, the air distributes itself substantially equally between the two cushion sections.

The air cushion of the present invention is preferably fabricated from sheet plastic or other leakproof material, and lends itself to being economically formed from a single strip 21 of such material. This is readily accomplished by selecting such a strip of such plastic or other material, of a width equal to the contemplated length of the finished cushion, and as a first step, folding such strip in half.

The holes which are to form the air communication passage between the cushion sections may then be punched through the folded-over strip within such symmetrical area 17 in proximity to the fold line 23, and the adjacent portions of the folded-over strip then sealed about such area. When of plastic, the sealing may be done electronically.

Each half of the strip is then folded back upon itself with sufficient overhang to form the flap 11. The cushion sections may then be completed by sealing in the same manner, the layers of each half along adjacent edges, and all the layers along the initial fold line. The free edges of the flap layers may likewise be sealed.

The air valve 13 may be assembled at its proper location, at any convenient stage in the fabrication of the air cushion.

It will be apparent from the foregoing description of my invention in its preferred form, that the same fulfills all the objects of the present invention, and while I have described such preferred embodiment in considerable detail, the same is subject to alteration and modification without departing from the underlying principles involved and I accordingly do not desire to be limited in my protection to such details except as may be necessitated by the appended claims.

I claim:

1. An air cushion comprising a pair of hollow inflatable cushion sections, each having a front wall and a back wall, means joining the walls of both sections along a common edge, means joining the back wall of one section to the front wall of the other section over an area, valve means in a wall of one of said inflatable sections to provide for the introduction of air into said section, and means establishing air communication between said inflatable sections, said means including a hole through said joined back and front wall within said area.

2. An air cushion comprising a pair of hollow inflatable cushion sections, each having a front wall and a back wall, means joining the walls of both sections along a common edge, a flap extending from said common edge, means joining the back wall of one section to the front wall of the other section over an area, valve means in a wall of one of said inflatable sections to provide for the introduction of air into said section, and means establishing air communication between said inflatable sections, said means including a hole through said joined back and front wall within said area.

3. An air cushion comprising a pair of hollow inflatable cushion sections of sheet plastic material, each having a front wall and a back wall, with the walls of both sections electronically sealed to one another along a common edge, a flap extending from said common edge, means joining the back wall of one section to the front wall of the other section over an area, valve means in a corner of a wall of one of said inflatable sections to provide for the introduction of air into said section, and means establishing air communication between said inflatable sections, said means including a hole through said joined back and front wall within said area.

References Cited in the file of this patent

UNITED STATES PATENTS

| Number | Name | Date |
|---|---|---|
| 1,382,531 | Newborn | June 21, 1921 |
| 2,612,645 | Boland | Oct. 7, 1952 |

FOREIGN PATENTS

| Number | Country | Date |
|---|---|---|
| 700,715 | France | Jan. 2, 1931 |
| 727,243 | Germany | Sept. 24, 1942 |

OTHER REFERENCES

Air Rubber Corporation, February 23, 1926, page 2.